US010634650B2

(12) United States Patent
Goodman et al.

(10) Patent No.: US 10,634,650 B2
(45) Date of Patent: Apr. 28, 2020

(54) CONTINUOUS ULTRASONIC FAULT DETECTION

(71) Applicant: U.E. Systems, Inc., Elmsford, NY (US)

(72) Inventors: Mark A. Goodman, Cortlandt Manor, NY (US); William Bishop, Pleasantville, NY (US); Gary Mohr, Cortlandt Manor, NY (US)

(73) Assignee: U.E. SYSTEMS, INC., Elmsford, NY (US)

(*) Notice: Subject to any disclaimer, the term of this patent is extended or adjusted under 35 U.S.C. 154(b) by 150 days.

(21) Appl. No.: 15/845,563

(22) Filed: Dec. 18, 2017

(65) Prior Publication Data

US 2019/0187106 A1 Jun. 20, 2019

(51) Int. Cl.
| | | |
|---|---|---|
| *G01N 29/44* | (2006.01) | |
| *G01N 29/36* | (2006.01) | |
| *G01N 29/28* | (2006.01) | |
| *G01N 29/14* | (2006.01) | |
| *G01N 29/48* | (2006.01) | |

(52) U.S. Cl.
CPC ......... *G01N 29/4427* (2013.01); *G01N 29/14* (2013.01); *G01N 29/28* (2013.01); *G01N 29/36* (2013.01); *G01N 29/4445* (2013.01); *G01N 29/48* (2013.01)

(58) Field of Classification Search
CPC .......... G01N 29/4427; G01N 29/4445; G01N 29/48; G01N 29/28; G01N 29/14; G01N 29/36
USPC .......................................... 73/602
See application file for complete search history.

(56) References Cited

U.S. PATENT DOCUMENTS

| | | | |
|---|---|---|---|
| RE33,977 E | 6/1992 | Goodman et al. | |
| 6,711,952 B2* | 3/2004 | Leamy | F01D 21/00 73/579 |
| 7,369,965 B2* | 5/2008 | Mylaraswamy | F01D 21/003 702/185 |
| 9,200,979 B2 | 12/2015 | Goodman et al. | |
| 9,881,510 B2* | 1/2018 | Groningen | G09B 5/00 |
| 10,295,435 B1* | 5/2019 | Wu | G01M 5/0033 |
| 2009/0150094 A1* | 6/2009 | Van Velsor | G01N 29/07 702/39 |

* cited by examiner

*Primary Examiner* — Jacques M Saint Surin
(74) *Attorney, Agent, or Firm* — Leason Ellis LLP

(57) ABSTRACT

An ultrasonic mechanical defect and/or fault detection and monitoring system includes at least one ultrasonic fault detection device configured to measure ultrasonic emissions from an object under evaluation and to generate an output signal in response thereto. The system further includes at least one processor configured by code to receive the generated output signal; access a library of stored signal patterns; compare the generated output signal against the library of stored signal patterns; and generate an alert where the generated output signal matches at least one of the library of stored signal patterns.

15 Claims, 5 Drawing Sheets

CONTINUOUS ULTRASONIC FAULT DETECTION

FIELD OF THE INVENTION

By way of overview and introduction, various embodiments of the apparatus, systems and methods described herein are directed towards monitoring electrical and mechanical hardware using ultrasonic devices.

BACKGROUND OF THE INVENTION

U.E. Systems of Elmsford New York, manufactures and sells devices used to detect and quantify faults in electrical equipment. For example, U.E. Systems sells various devices that use ultrasonic transducers to determine the fault status of electrical cabinets and the bearings of motors.

Ultrasonic sensors have been used in the past to detect ultrasonic energy generated by friction within mechanical devices, such as that created by deteriorated motor bearings. For example, U.S. Pat. No. Re. 33,977 to Goodman, et al., and U.S. Pat. No. 9,200,979 to Goodman et al., the contents of which are hereby incorporated herein by reference in their entirety, disclose such an ultrasonic fault detection device. With the disclosed devices the amount of mechanical friction a device is undergoing is related to the intensity of the generated ultrasonic energy. For example, faulty devices, such as bearings, generate a higher level of ultrasonic energy than do good bearings and thus, whether the bearings are good or bad can be detected.

However, the present art still suffers from a lack in accuracy. Specifically, the amplitude of an ultrasonic signal created by electrical discharge in an electrical cabinet or a worn bearing in a motor is not a completely accurate predictor of the condition of the electrical circuit or bearings.

Thus, what is needed in the art are apparatus, systems and methods that utilize additional data beyond the amplitude of the ultrasonic signal to determine the mechanical defects or fault state present in various electrical and mechanical devices.

SUMMARY OF THE INVENTION

The following summary of the invention is provided to give a basic understanding of some aspects and features described herein. This summary is not an extensive overview, and as such it is not intended to particularly identify key or critical elements of the systems, methods or apparatus described, or to delineate the scope thereof. Its sole purpose is to present some concepts in a simplified form as a prelude to the more detailed description that is presented below.

In one or more specific configurations, a system is provided for autonomously monitoring the bearings of motors or electrical discharge in electrical cabinets. The system includes at least one ultrasonic monitoring device configured to communicate with at least one processor configured to execute code. The processor, through code, evaluates ultrasonic data obtained by the ultrasonic monitoring devices utilizing one or more user defined patterns of ultrasound that, upon identification, will trigger an alarm indicating a further action. In yet a further implementation, the system of the present invention includes machine learning based on a pattern recognition algorithm configured to associate the pattern of ultrasound bursts or pops with a specific failure condition.

BRIEF DESCRIPTION OF THE DRAWINGS

The apparatus, systems and methods described herein are illustrated in the figures of the accompanying drawings, which are meant to be exemplary and not limiting, and in which like references are intended to refer to like or corresponding parts, and in which.

DETAILED DESCRIPTION OF CERTAIN EMBODIMENTS OF THE INVENTION

By way of overview and introduction, various embodiments of the apparatus, systems and methods described herein are directed towards making determinations about the state of electrical or mechanical devices based on ultrasonic measurements. More specifically, the provided disclosure details the use of real time ultrasonic measurements to provide more accurate indicators of failure comparable to the mechanical defect and/or fault detection systems available in the art.

For example, the present apparatus, systems and methods described are directed not only to the measurement of the amplitude or frequency of ultrasonic signals to detect and anticipate mechanical defects and/or electrical faults, but also to the analysis of patterns of ultrasonic signals received while monitoring equipment. Such information is used to deduce mechanical defects or faults in the hardware. More specifically, the described configurations are directed to obtaining measurement data corresponding to the number of bursts or pops of ultrasound that exceed a pre-set threshold (as used herein "excursions") within a defined period of time, and using that measurement data to evaluate or determine the failure state of a device or machine under analysis.

Figure 1:
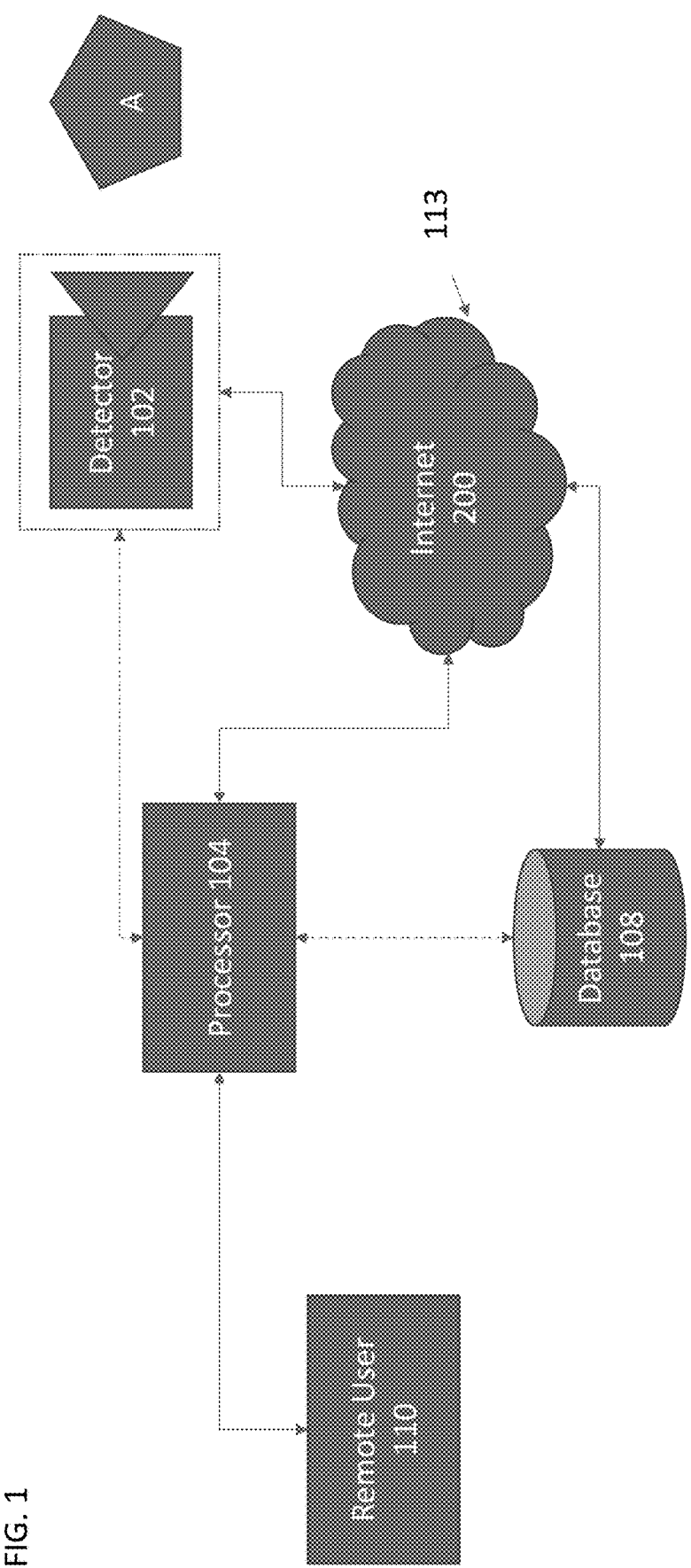
FIG. 1 illustrates a block diagram of an overview of a device monitoring system according to one embodiment of the present invention described herein.

Turning to FIG. 1, one or more ultrasonic mechanical defect and fault detector devices 102 are used to monitor the status of a piece of hardware A. In one or more configurations, the ultrasonic mechanical defect and fault detector device 102 is provided in a portable housing (shown in dotted line) and includes the necessary circuitry and or software modules to manage the operations of an ultrasonic transducer incorporated into the ultrasonic fault detector device 102. For instance, the ultrasonic fault detection device 102 includes an ultrasonic transducer, an analog front-end circuit connected to the transducer, a front-end processor circuit, a Bluetooth circuit, a TCP/IP internet connection, a wireless communications interface, and a main processor or CPU. Each of these components are stacked together and connected by a bus which carries the primary signals, such as the audio signal WAV for output for further processing. For instance, the main CPU controls all of the functions of the detector. In one or more implementations, the main CPU converts the WAV signal to a spectrum by performing a Fast Fourier transform (FFT) on a portion of it. In another implementation, the main CPU outputs the data of a current ultrasonic measurement as a digital file. The ultrasonic fault detection device includes one or more wireless communication modules (such as but not limited to Wi-Fi). Such a detector may be a UE Systems Model 10,000 as described in U.S. Pat. No. 9,200,979.

By way of a non-limiting example, the ultrasonic fault detection device 102 also includes one or more optical or strobe tachometers, IR cameras, vibration analyzers or any other device configured for environmental sensing. As such, a variety of non-ultrasonic data gathered by the ultrasonic fault detection device 102 tool can be combined into a single source of information for later use.

Figure 2:
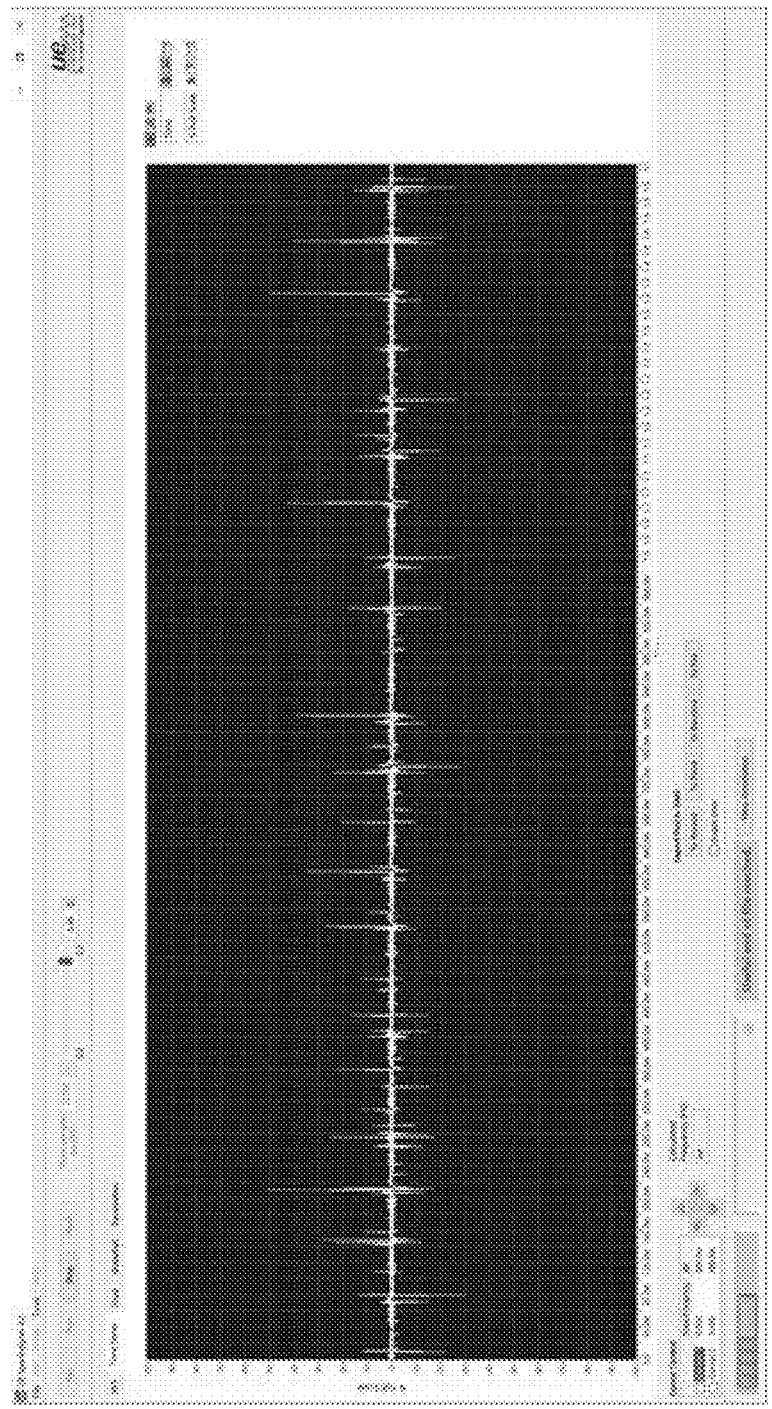
FIG. 2 provides an illustrative graph of the signal generated by the ultrasonic fault detector device according to one embodiment of the present invention described herein.

In a particular arrangement, the ultrasonic fault detection device 102 is configured to heterodyne an ultrasonic signal by passing the raw ultrasonic signal generated by the ultrasonic transducer through a plurality of heterodyne modules or circuits so as to convert the ultrasonic frequency signal to an audio signal. The audio output can, in a particular implementation, generate a D.C. signal that is equivalent to the amplitude of the audio signal in db. as shown in FIG. 2.

By way of a non-limiting example, the ultrasonic fault detection device 102 also includes the ability to connect with any wirelessly equipped stand-alone information recording device. In one or more implementations the ultrasonic mechanical defect and fault detector 102 is configured to receive instructions from a local or remote processor 104. The ultrasonic mechanical defect and fault detector 102 can also be mounted to a stand or holder.

In one implementation, the ultrasonic mechanical defect and fault detector 102 can be attached by any other mechanism (e.g., a probe) that places it in acoustical contact with the device, e.g., motor housing bearings, to be measured. In an alternative implementation, the ultrasonic fault detector 102 is placed, positioned or provided in sufficient proximity to a device under analysis so as to make suitable ultrasonic measurements.

As shown in FIG. 1, the processor 104 described herein is provided separately from the ultrasonic mechanical defect and fault detection device 102. However, in an alternative configuration, the processor 104 is incorporated within the housing of the ultrasonic fault detector 102. In yet a further implementation, the processor 104 is a component of the ultrasonic mechanical defect and fault detection device 102 (for example, the main processor). For example, the various calculations, processes, and procedures carried out by processor 104 can, in a particular configuration, be carried out by the processor of the ultrasonic fault detector 102 or additional processor(s) integrated into the ultrasonic fault detector 102.

Without limitation to potential embodiments, the ultrasonic emissions from device A, which is under analysis, are picked up by the ultrasonic transducers of the ultrasonic mechanical defect and fault detection device 102 and passed to the processor 104. In one implementation, the signals measured by the mechanical defect and fault detection device 102 are transmitted to the processor 104 as an analog or digital signal. In another configuration, the transmitted data is transferred as a digital data stream or as digital file. Further, when the processor 104 is physically close to the mechanical defect and fault detector 102 the two deices may be hard wired together or connected by an rf signal (e.g., Bluetooth or Wi-Fi) as indicated by dotted line 111 in FIG. 1. If processor 104 is more remote it can be connected to the detector 102 over the Internet 113.

As will be described in more detail below, processor 104 measures the ultrasonic signal and stores the results in data base 108 for further processing. In particular, processor 104 may also receive user inputs from a remote processor 110 which sets the values and limits on the ultrasonic signal which will be determined to be mechanical defect and/or fault conditions. The actual determination the occurrence and type of mechanical defect and/or fault indicated by the stored ultrasonic signals is achieved in processor 104.

In one or more further implementations, by transmitting the measured ultrasonic data from the detection device 102 to one or more remote processors 104, the ultrasonic monitoring systems and methods described herein permit the remote monitoring of hardware. For example, the presently described apparatus, system and methods are configured to monitor bearings on motors or electrical discharge in electrical cabinets on a continuous, 24 hours a day, 7 days a week basis. Such monitoring is done by locally evaluating equipment for pre-determined or derived patterns of ultrasonic signals emitted and then transmitting the measured data to a local or remote processor 104, 110 for evaluation. More specifically, the apparatus, systems and methods described herein are configured to continuously record and store measurement data from the ultrasonic measurement instrument locally. However, upon determinations that the measured values exceed or surpass pre-set intervals, mechanical defect or fault conditions, the locally stored data (such as measurement data and sound samples) is sent to a remote computer or processor 110 for reporting and further analysis.

Figure 3:
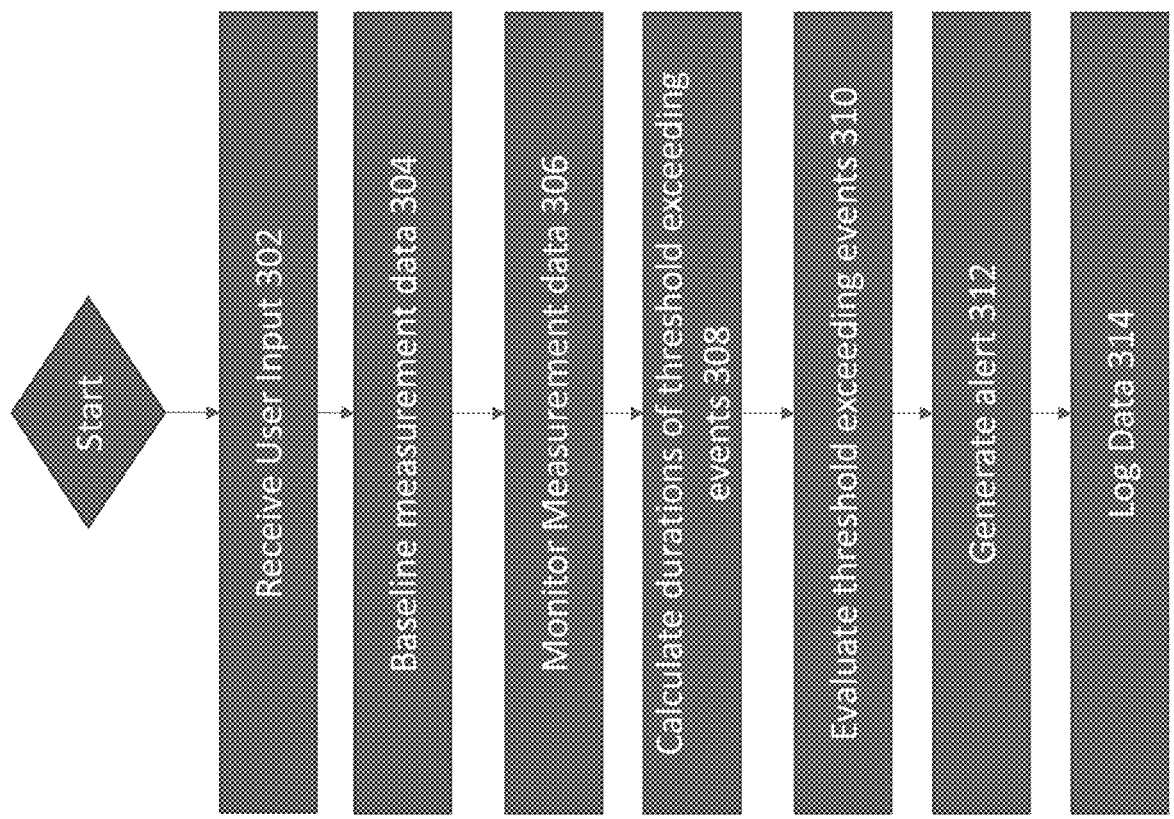
FIG. 3 presents a flow chart detailing exemplary steps for carrying out one embodiment of the present invention described herein.
Figure 4:
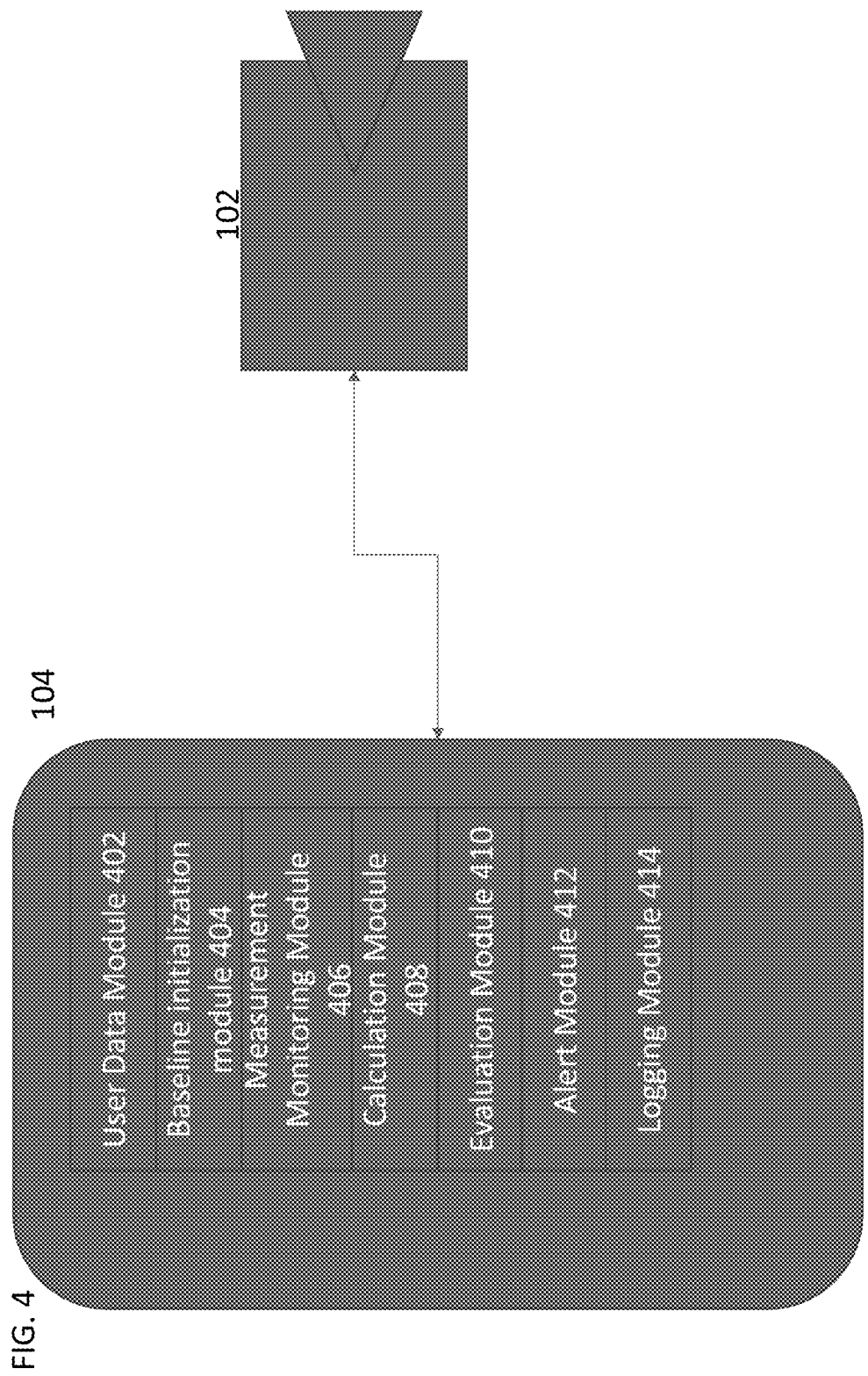
FIG. 4 presents a block diagram detailing specific functionality of the device monitoring device according to one embodiment of the present invention.

Turning to FIGS. 3 and 4, the processor 104 is configured by one or more user data modules 402, such as by software executing therein, to utilize user data to evaluate mechanical defect and/or fault status. For instance, one or more sub-modules of the user data module 402 configures the processor 104 to receive user input, as shown in step 302. In one implementation, the user input module 402 receives input data from a local user. In an alternative configuration, the user input module 402 receives user input from a remote user (such as a user of remote computer or processor 110). For example, a user remotely accesses the processor 104 via local area network 115 using remote processor 110. In a further configuration, the processor 104 configured by the user input modules 402 receives user input data from a computer via the Internet 113.

Figure 5:
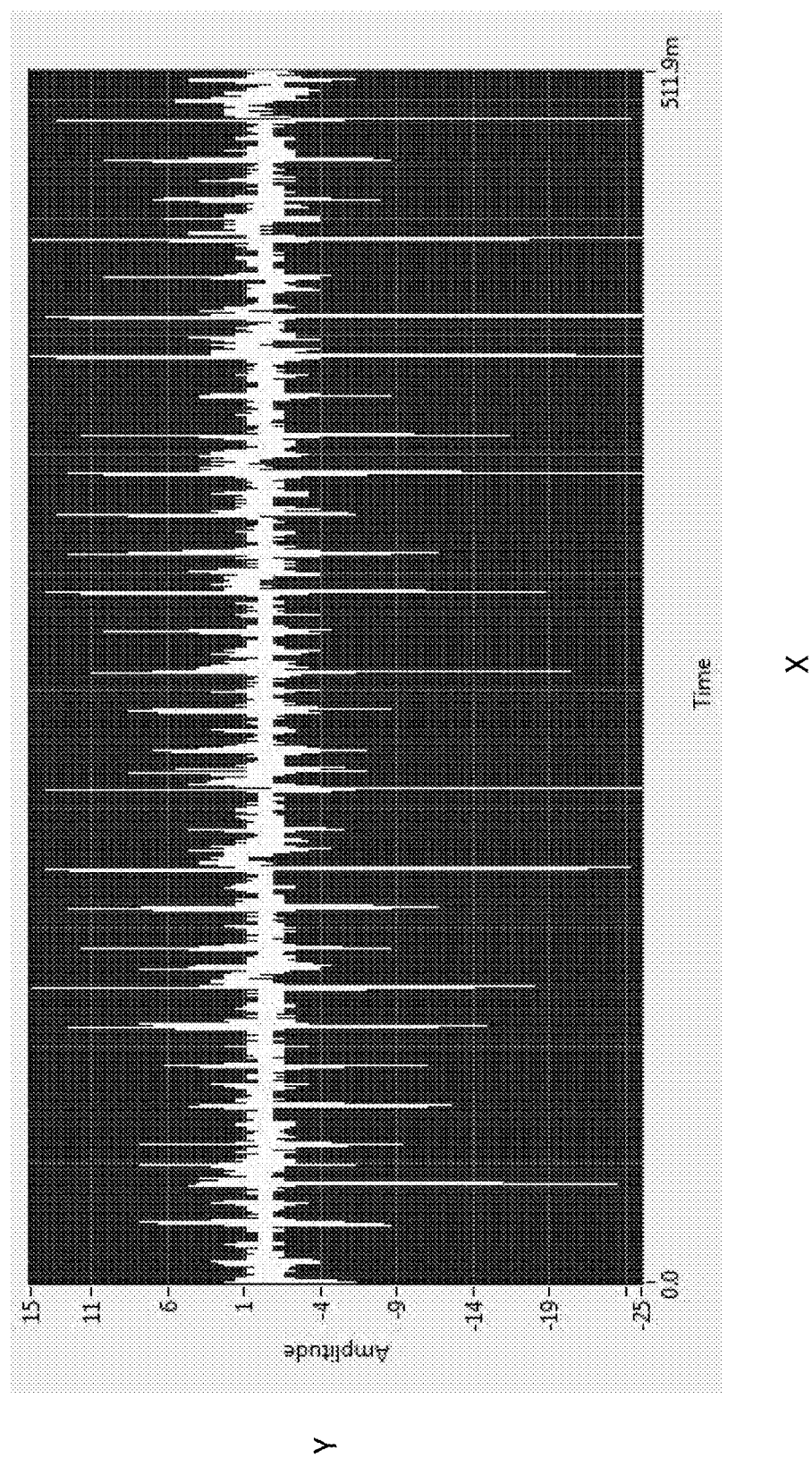
FIG. 5 presents a graph comparing the performance of the present embodiments provided herein.

In a particular implementation, the user input data received or retrieved by the processor 104 includes user defined amplitude triggering data. For instance, the user input data includes values corresponding to an amplitude threshold value and various increments above the threshold value. For example, the threshold amplitude is set at a given value along with increments equal to ±1% of the Full Scale amplitude reading. (See "Y" axis of the time series provided in FIG. 5). In yet a further implementation, the user input module 402 configures the processor 104 to receive data relating to the length of time the processor 104 will evaluate the measurement data. For instance, the user data received by a processor 104 configured by the user input module 402 includes event timing data, such as a value indicating the amount of time (in seconds, minutes, or hours) to obtain measurement data. See "X" axis of the time series in FIG. 5).

In yet a further implementation, the user input module 402 configures the processor 104 to receive user data relating to a pattern of measurement data corresponding to an anticipated failure state or condition. In one non-limiting configuration, the received user data includes the number and duration of measurements of ultrasonic excursions that exceed the user selected threshold that represent an error or failure condition. In an illustrative example, the received user data includes pre-set thresholds as well as conditional logic. For instance, the user data may provide the processor 104 with instructions to flag, identify or evaluate measurement data where the measured values exceed a user selected threshold. Such a pattern indicates that a mechanical defect and/or fault or malfunction could be occurring or has occurred. For instance, the user data provided by the user input module 402 indicates a pattern where the measured values exceed the pre-set threshold and/or there have been more than two excursions above the threshold with within a 10 second period and/or one of those excursions is longer than a further predefined value.

In another illustrative example, the user sets an alert pattern corresponding to situation wherein if a measured value exceeds the pre-set threshold by more than 70% of scale. In yet a further configuration, the user input data provides values that determine or evaluate a rise in overall sound level, (i.e., the value of the dB level over a baseline value).

In a further arrangement, the user data includes an alert pattern that identifies two (2) or more bursts that exceed the threshold in a 10 second period, and the duration of at least one burst is longer than 100 microseconds. For example, such a pattern is typical of an electrical discharge.

The user data module 402 further permits a user to configure the processor 104 to alter any one of the four (4) parameters (amplitude, duration, number of occurrences and measurement duration) used by the processor 104 to evaluate the measurement data.

As shown in step 304, the processor 104 configures the ultrasonic mechanical defect and/or fault detection device 102 to establish or set an average baseline amplitude level (±100% Full Scale reading). However, it should be appreciated that such a baseline amplitude can be established by accessing a stored local or remove value.

In an alternative configuration, the processor 104 is configured by a baseline initialization module 404 to access the ultrasonic device measurements and determine a baseline amplitude level. In one particular implementation, the baseline initialization module 404 includes one or more submodules that instruct or control the operation of the ultrasonic fault detection device 102. For example, a submodule of the baseline initialization module 402 causes the activation of the ultrasonic mechanical defect and/or fault detection device 102 and determines the duration or frequency of any measurements made to determine the baseline amplitude level value (such as an average amplitude over a given period of time). In a further implementation, the baseline initialization module 402 includes one or more submodules that configure the processor 104 to store the baseline amplitude level. In yet a further implementation, the baseline initialization module 402 includes one or more submodules that configure the processor 104 to access a stored baseline value.

The processor 104 is configured to monitor the measurement data for the duration of the time period identified in the user data as in step 306. For instance, the processor 104 is configured by monitoring module 406 to monitor the measurement data during the pre-determined time period specified in the user data. In one implementation, when a measurement value has an amplitude in the time series that exceeds a threshold value set by the user data, the monitoring module 406 configures the processor 104 to count and accumulate the number of amplitude excursions that exceeds the ±threshold triggering level. In a further implementation, the monitoring module 406 or one or more submodules thereof, is configured to store in memory 108 the amplitude level (% Full Scale) of each measured event that exceeds the pre-determined threshold.

In a further implementation, the processor 104 calculates the time duration of each excursion as shown in step 308. For instance, a calculation module 408 configures the processor to determine the time duration of each measured excursion that exceeds the amplitude triggering threshold. In a further implementation, the processor 104 is configured to record the measured excursions and label the measured excursions with at least date and time metadata.

In one or more implementations, the processor 104 is also configured to evaluate the calculated and measured excursions as in step 310. For instance, an evaluation module 410 configures the processor 104 to evaluate the measured excursions against a pattern provided in the user data. For example, where the processor 104 determines that the number and duration of measurements exceeding the user provided thresholds matches the error patterns provided, an alert flag is generated.

In one or more implementations, the evaluation module 410 configures the processor 104 to access the alert pattern data provided by the user in step 304 and evaluate the measurement data. In an alternative configuration, the processor 104 is configured by the evaluation module 410 to access the one or more stored alert patterns. Here, the evaluation module includes one or more submodules that configure the processor to access remote or local databases 108 of alert patterns and evaluate the measured data against the retrieved alert patterns.

By way of illustrative example, the evaluation module 410 identifies measurement data where the amplitude of the ultrasonic measurement data exceed 40% of the pre-set threshold at least twice or more times in a 60 millisecond time period with one (1) or more being longer than one (1) millisecond. These parameters trigger an electrical discharge alert as shown in step 312.

In a further implementation, the evaluation module 410 includes one or more submodules to generate new alert patterns based on user input or measurement data. For example, using one or more machine learning algorithms, the processor 104 is configured to evaluate from a collection of tagged or untagged measurement data and derive new alert patterns to evaluate the measurement data. For example, if an unknown pattern is measured and physical investigation shows it is related to a certain type of mechanical defect and/or fault, that measured pattern is stored and associated with the mechanical defect and/or fault.

In a further implementation, machine learning algorithms are used by the evaluation module 410 to match the measurement data to alert patterns. For instance, in some instances the alert pattern may not be a complete match to the measurement data. Here, one or more machine learning algorithms are used to determine if the percentage or degree of similarity between one or more alert patterns and the measurement data indicate or suggest that one or more alert flags should be generated.

Upon determining that the measurement data matches an alert pattern, the processor is configured to generate an alert as in step 312. For instance, the processor is configured by alert module 412 to generate an alert signal. One or more submodules of the alert module 412 configure the processor 104 to send the generated alert to a pre-determined recipient such as the remote computer 110. The alert can be in the form of a flag or notification regarding the measured condition. For instance, the alert may be a composed message that is sent electronically via the Internet to one or more recipients. The message includes data corresponding to the alert and the alert pattern identified. Additionally, the composed message can include additional information such as audio files, data files or other information collected by the measurement device(s).

In one or more particular implementations, the alert module 412 configures the processor to begin recording the measurement values for later analysis. It should also be appreciated that the alert module 412 can pass information and data to the user data module 404. For instance, the alert condition, when derived algorithmically, can be stored in the user data as an additional pattern for use by the same or a different ultrasonic fault detection device 102.

The alert module 412 further configures the processor 104 to receive user input regarding the alert state. For example, a user can send one or more data objects or signals to the processor in response to the receipt of an alert message. Where such user generated response data includes data indicating that the alert can be ignored. The alert module 412 configures the processor 104 to pass that information to a user input data store or memory location.

It should be appreciated that the evaluation module 410 can evaluate the data included in prior ignored alerts to generate new patterns for measurement data that can be ignored.

Further, the processor 104 is configured by a logging module 414 to store sound files and readings obtained from the ultrasonic mechanical defect and fault detection devices 102 both locally on the tool and in remote databases. However, in a particular implementation the stored logging data is not transmitted unless an alert condition has been met. Specifically, the systems and methods described herein eliminate the need to continuously communicate and process logged data. As a result, data usage and bandwidth are conserved and made available for other uses. Such implementations reduce traffic on the network and diminish the amount of data a computer needs to save when nothing noteworthy has occurred. Also, once the ultrasound readings and .wav or other audio files are obtained they can be stored in an Ethernet protocol. This makes them easy to access from anywhere, and transmitted via wireless, satellite, etc.

Returning to FIG. 1, as used throughout, the processor 104 and computer 110 are commercially available computing devices. For example, the processor 104 and remote computer 110 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 and remote computer 110 can comprise a single processor, multiple discrete processors, a multi-core processor, or other type of processor(s) known to those of skill in the art, depending on the particular embodiment. The processor 104 and remote computer 110 execute software code on the hardware of a custom or commercially available cellphone, smartphone, notebook, workstation or desktop computer configured to receive signals generated by the ultrasonic mechanical defect and/or fault detection device 102 either directly, or through a communication linkage.

The processor 104 and remote computer 110 is further configured to execute a commercially available or custom operating system, e.g., MICROSOFT WINDOWS, APPLE OSX, UNIX or Linux based operating system in order to carry out instructions or code.

In one or more implementations, the processor 104 and remote computer 110 are further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

The processor 104 is configured to store data either locally in one or more memory devices. Alternatively, the processor 104 is configured to store data, such as measurement data or processing results, in a local or remotely accessible database 108.

The physical structure of the database 108 may be embodied as solid-state memory (e.g., ROM), hard disk drive systems, RAID, disk arrays, storage area networks ("SAN"), a network attached storage ("NAS") and/or any other suitable system for storing computer data. In addition, the database 108 may comprise caches, including database caches and/or web caches. Programmatically, the database 108 may comprise a flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the processor 104 to retrieve and store data within the database 108.

In one implementation, each element provided in FIG. 1 is configured to communicate with one another through one or more direct network connections or interfaces, such as a local area network LAN or data cable connection. In an alternative implementation, the ultrasonic fault detection device 102, processor 104, and database 108 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 108 and ultrasonic fault detection device 102 Here, the processor 104 may be provided with a display device (not shown) for displaying data, as well as inputting data. For example, the display device may enable a user to send commands and/or instructions to the processor 104 and the ultrasonic fault detection device 102.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. An ultrasonic monitoring system comprising:
   at least one ultrasonic detection device configured to measure ultrasonic emissions from an object under evaluation and generate an output signal in response thereto;
   at least one processor configured by code to:
      receive the generated output signal;
      access a library of stored signal patterns, where each of the library of stored signal patterns includes at least one pre-determined threshold value which, when exceeded, corresponds to an anticipated failure state of the object under analysis;
      compare the generated output signal against the library of stored signal patterns; and
      generate an alert where the generated output signal matches at least one of the library of stored signal patterns.

2. The system of claim 1 wherein the processor is configured to compare the generated output signal against the library of stored signal patterns by using one or more machine learning algorithms to evaluate the generated signal output and classify it as being substantially similar to one entry of the library of stored signal patterns by determining if the generated signal is within a pre-determined range of one or more entries in the library of stored signal patterns.

3. The system of claim 1 wherein the processor further includes code to accept user inputs that define parameters that define signal patterns for inclusion in the library of stored signal patterns.

4. The system of claim 1, wherein comparing the generated output signal to the at least one of the library of stored signal patterns includes:
   identifying a portion of the output signal that exceeds a pre-determined threshold by more than a certain percentage or more a number of times within a certain period with at least one of the portions exceeding the pre-determined threshold by more than the certain percentage for a certain duration.

5. The system of claim 4 wherein the certain percentage is 40%, the number of times is at least twice and the certain period is 60 milliseconds.

6. The system of claim 1, where generating the alert includes:
   establishing a connection to at least one remote computer; and
   transmitting the alert at the at least one remote computer.

7. The system of claim 2, wherein the user inputs include threshold data that determines a threshold value for the signal to exceed prior to evaluating the signal against the library of stored patterns.

8. The system of claim 1, where generating the alert includes:
   identifying the member of the library matched to the generated output signal;
   composing a message containing at least reference to the identified library member; and
   transmitting the composed message to at least one remote computer.

9. The system of claim 1, wherein comparing the generated output signal to the library of stored signal patterns includes:
 accessing one or more stored pattern matching algorithms; and
 evaluating the output signal against the library of patterns using at least the accessed pattern matching algorithm.

10. An ultrasonic detection and monitoring system comprising:
 at least one ultrasonic detection device configured to measure ultrasonic emissions from an object under evaluation and generate an output signal in response thereto;
 at least one processor configured by code to:
  accept user inputs that set thresholds that define at least one alarm signal pattern, wherein the threshold values, when exceeded, correspond to an anticipated failure state of the object under evaluation;
  receive the generated output signal;
  compare the generated output signal against the alarm signal pattern; and
  generate an alert where the generated output signal matches or exceeds a threshold of the alarm signal pattern.

11. The system of claim 10 wherein the processor is further configured to store in a library those signal patterns that result in an alarm.

12. The system of claim 11 wherein the processor is additionally configured to compare the generated output signal against the signal in the library of stored signal patterns; and
 generate an alert when the generated output signal matches at least one of the library of stored signal patterns.

13. The system of claim 12, where the processor evaluates the output signal using one or more machine learning algorithms to classify the output signal as being similar to one or more of the entries of the library of stored signal patterns, and determining that a match has been made when the output signal is within a predetermined range of at least one entry of the library of stored signal patterns.

14. The system of claim 1, wherein the each of the library of stored signal patterns includes at least two pre-determined thresholds values.

15. The system of claim 14, where the pre-determined threshold values are selected from the following parameters: amplitude, duration, number of occurrences and measurement duration.

* * * * *